(12) United States Patent
Bestermann et al.

(10) Patent No.: US 11,863,531 B2
(45) Date of Patent: Jan. 2, 2024

(54) VIRTUAL TENANT ACCOUNT MANAGEMENT FOR AN MDU

(71) Applicant: ARRIS Enterprises LLC, Suwanee, GA (US)

(72) Inventors: John R. Bestermann, Suwanee, GA (US); David Sutton, Garland, TX (US)

(73) Assignee: ARRIS Enterprises LLC, Suwanee, GA (US)

( * ) Notice: Subject to any disclaimer, the term of this patent is extended or adjusted under 35 U.S.C. 154(b) by 205 days.

(21) Appl. No.: 17/385,050

(22) Filed: Jul. 26, 2021

(65) Prior Publication Data

US 2022/0038432 A1 Feb. 3, 2022

Related U.S. Application Data

(60) Provisional application No. 63/057,713, filed on Jul. 28, 2020.

(51) Int. Cl.
*H04L 9/40* (2022.01)
*H04W 12/08* (2021.01)

(52) U.S. Cl.
CPC .......... *H04L 63/0272* (2013.01); *H04L 63/10* (2013.01); *H04L 63/20* (2013.01); *H04W 12/08* (2013.01)

(58) Field of Classification Search
CPC ..... H04L 63/0272; H04L 63/10; H04L 63/20; H04W 12/08
See application file for complete search history.

(56) References Cited

U.S. PATENT DOCUMENTS

| | | |
|---|---|---|
| 9,049,030 B1 | 6/2015 | Pogde et al. |
| 2002/0009078 A1 | 1/2002 | Wilson et al. |
| 2010/0293183 A1* | 11/2010 | Yaqub ..................... G06F 16/58 709/224 |
| 2015/0135295 A1* | 5/2015 | Sample ................. H04L 67/565 726/7 |
| 2018/0242154 A1* | 8/2018 | Ballard ............... H04L 61/5061 |
| 2019/0104411 A1* | 4/2019 | Hotchkiss ............. H04W 12/08 |
| 2019/0268762 A1* | 8/2019 | Bestermann ........ H04L 12/4641 |
| 2019/0355075 A1 | 11/2019 | Lok et al. |
| 2021/0076216 A1* | 3/2021 | Hotchkiss ........... H04W 12/069 |

OTHER PUBLICATIONS

"Notification of Transmittal of the International Search Report and the Written Opinion of the International Searching Authority, or the Declaration for corresponding International Application No. PCT/US2021/043155, dated Oct. 29, 2021, (14 pages)".

* cited by examiner

*Primary Examiner* — Chau Le
(74) *Attorney, Agent, or Firm* — Steven Stupp; Stewart Wiener

(57) ABSTRACT

Systems and methods for combining personal networks in a Multi-Dwelling Unit (MDU).

10 Claims, 7 Drawing Sheets

VIRTUAL TENANT ACCOUNT MANAGEMENT FOR AN MDU

BACKGROUND

Infrastructure for a WiFi, wireless and/or wired network may be owned and/or managed by a provider that makes make the network available for use by multiple other unrelated entities. Examples of such networks may be networks provided within hotels, apartment complexes, dormitory buildings, campuses, and other institutions hereinafter referred to as multiple dwelling unit (MDU) properties.

Accordingly, various electronic devices of the unrelated entities, such as computers, lap tops, tablets, smartphones, printers, gaming devices, televisions, customer premises equipment, gateways, cable boxes, and other devices of residents, students, etc., hereinafter referred to as "tenants," may be configured to connect to the MDU network via wireless or wired connections to enable Internet connectivity, for instance. For purposes of privacy, each device connecting to the shared MDU network is necessarily blocked from seeing the other devices on the network. Thus, it is not possible for one device connected to the MDU network to communicate, share, pull, transfer, or perform any other task with another device also connected to the MDU network solely and directly by way of the network itself. This is true even if the devices are commonly owned by the same entity.

By way of simple example, a school may offer an MDU network to students for wireless and/or wired connections to the network for purposes of connecting to the Internet or other source of information. An individual student may have multiple devices connected to the MDU network, such as a laptop computer and a wireless printer. Unfortunately, the printer would not be visible to the laptop, and thus, the student could not send a file for printing to his/her printer directly by way of the MDU network. Of course, if the student's printer was made visible to the student's laptop over the MDU network, then the student would be able to communicate from the laptop to the printer. However, in this scenario, the student's laptop would also necessarily be able to see all other student's devices and printers connected to the shared network, which is not desired from a privacy standpoint across an MDU network being accessed by multiple unrelated tenants.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the disclosed subject matter are described by referring mainly to examples thereof. In the following description, numerous specific details are set forth in order to provide a thorough understanding of such examples, or embodiments. It will be apparent to one of ordinary skill in the art that these embodiments may be practiced without these specific details. In some instances, well known methods and structures have not been described in detail so as not to unnecessarily obscure the embodiments.

According to an embodiment, a separate virtual network may be provided to each entity or individual across a wired and/or wireless MDU network on an MDU property having a managed WiFi infrastructure which is otherwise shared by multiple unrelated entities or individuals across the property. For instance, according to this embodiment, a managed network provided in an otherwise large-scale will appear to each individual user or tenant on the MDU property as a private or personal network such as provided in a routed single-family home, private premises, etc.

According to some embodiments, the WiFi infrastructure may use a single Service Set Identifier (SSID) across the property, or in other embodiments may use multiple Service Set Identifiers (SSIDs). A SSID is the name assigned to the managed WiFi (wireless) network and provides an IP address for the network. All devices in the network must use this case-sensitive name, typically a text string up to 32 bytes long, to communicate over the WiFi infrastructure. Thus, the client devices of each tenant of the MDU property necessarily use the same one or more SSIDs. It is possible that the MDU property may use an additional SSID for guests of the premises, or that a resident on the property has their own private network via their own private infrastructure.

According to some embodiments, each tenant on the MDU property may be provided with a "Personal Network" (PN) to which their wired and wireless devices, and only their wired and wireless devices, can intercommunicate throughout the MDU property independent of physical connection or network access point. Thus, for instance, a tenant may have multiple devices that connect to the MDU network and that are able to see and intercommunicate with each other. For instance, a laptop of the tenant connected to the Personal Network (PN) should be able to see his/her printer connected to the Personal Network (PN) and send a file to the printer over the MDU network for printing. However, according to this embodiment, the devices and Personal Network of the tenant are hidden/private relative to all other tenants on the property who may use the shared MDU network. In addition, the tenant can connect to his/her other devices and gain access to his/her Personal Network anywhere on the defined MDU property at any access or connection point or infrastructure.

Figure 1:
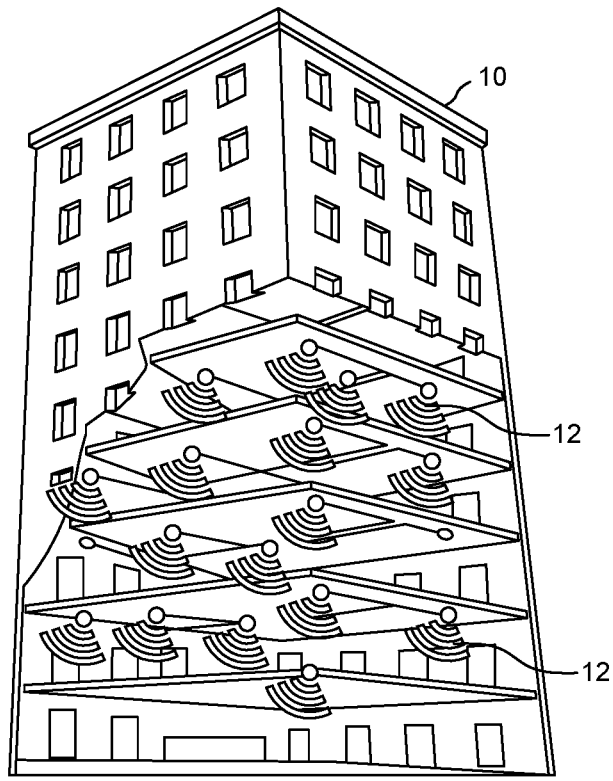
FIG. 1 is a schematic view of a MDU property having MDU network infrastructure in accordance to an embodiment.
Figure 2:
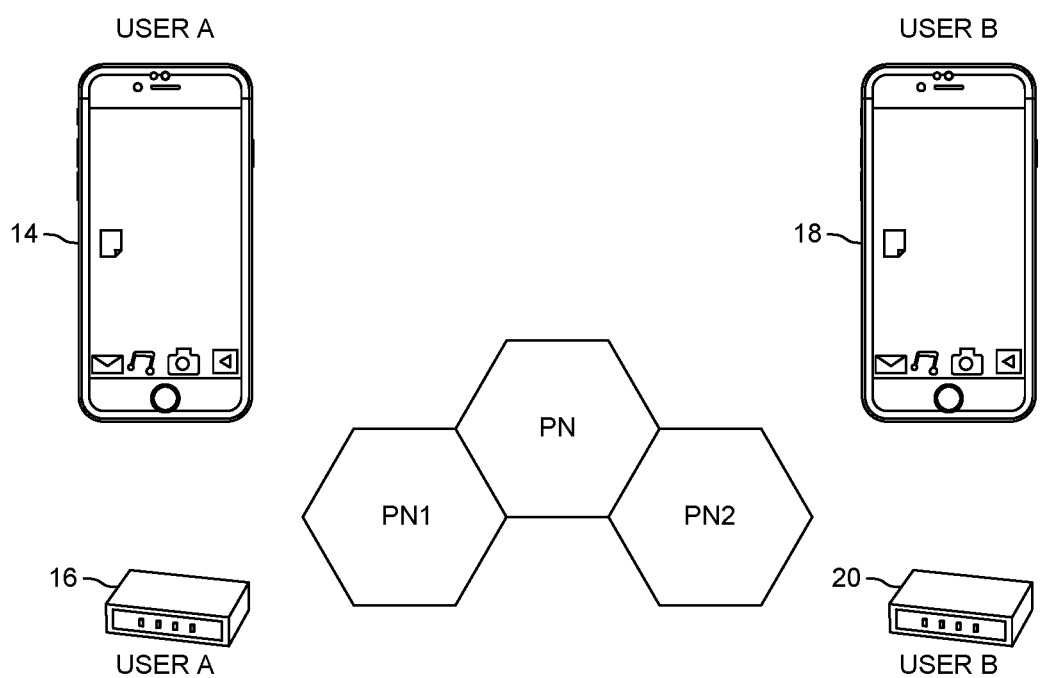
FIG. 2 is a schematic view of client devices of two tenants of a MDU property and Personal Networks thereof in accordance to an embodiment.

FIG. 1 illustrates a multiple dwelling unit (MDU) property 10, such as an apartment building, and numerous access or connection points 12 located throughout the MDU property 10 and forming part of a managed WiFi infrastructure. FIG. 2 shows two electronic devices, 14 and 16, of a "User A" and two electronic devices, 18 and 20, of a "User B".

"User A" is assigned one of the Personal Networks (PN1) shown schematically in FIG. 2 and "User B" is assigned a different one of the Personal Networks (PN2) shown schematically in FIG. 2. Thus, the devices 14 and 16 can see and communicate with each other on PN1 and are isolated and hidden from the devices 18 and 20.

According to an embodiment, the Personal Networks are provided using the IEEE 802.1x dynamic VLAN (Virtual Local Area Network) assignment feature provided by equipment configuring the infrastructure, such as switching routers (ISRs), with MAC (Media Access Control) authorization bypass to dynamically create a Personal Network for a tenant that may be accessed across the MDU property via any access point. MAC Authentication Bypass (MAB) is an access control technique which uses the MAC address of a device to determine the extent of network access to provide to the device. Accordingly, a tenant registers his/her devices which are assigned to a unique VLAN thereby providing a Personal Network to the tenant and his/her devices. Thus, a known tenant or user connects to the SSID, and 802.1x MAB authentication permits boarding of the device of the tenant on the assigned VLAN.

Figure 3:
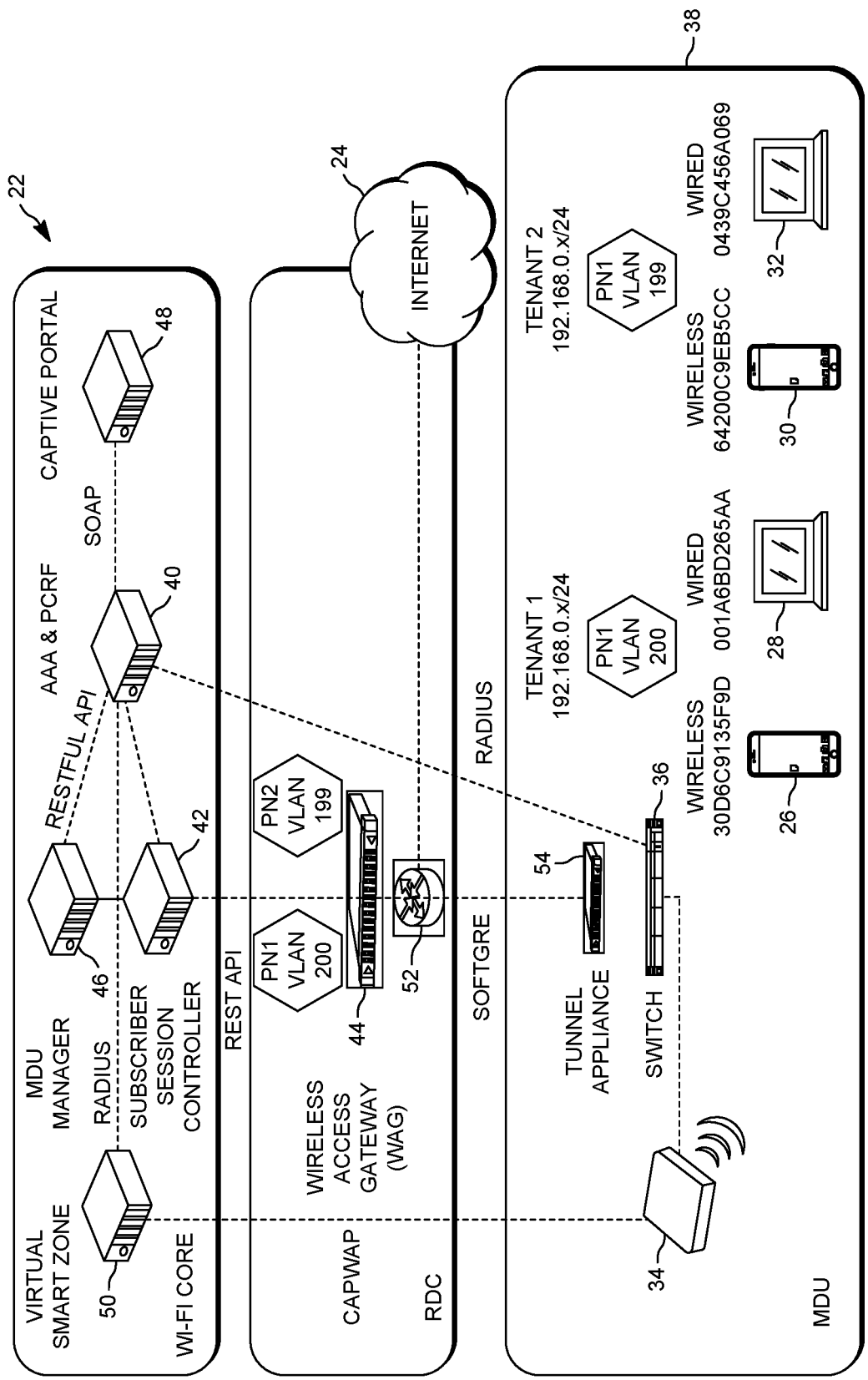
FIG. 3 is a schematic view of system architecture of infrastructure of a MDU property in accordance to an embodiment.

FIG. 3 shows a schematic view of system architecture 22 which provides different VLANs to different tenants and enables the tenants to access the Internet 24 or another network or source. In this example, Tenant 1 has two electronic devices, 26 (a wireless device) and 28 (a wired device), assigned a Personal Network (PN1), i.e., VLAN 200 on SSID 192.1680x/24, and Tenant 2 has two electronic devices, 30 (a wireless device) and 32 (a wired device), assigned a Personal Network (PN2), i.e., VLAN 199 on SSID 192.1680x/24. These devices may connect to a Personal Network on the MDU network via wireless or wired connections. For example, the devices may connect to a Personal network via the access point 34 of the managed infrastructure and associated switch 36, located on the multiple dwelling unit (MDU) property 38.

During MDU network creation for a MDU property, a captive portal and property ID are created by the AAA (Authentication, Authorization, and Accounting), and/or PCRF (Policy Control Management) unit 40 and a Captive Portal 48 for the MDU property 38. In the Subscriber Session Controller (SSC) 42 and Wireless Access Gateway (WAG) infrastructure 44 including tunnel appliances 54, a relationship is created that builds the property ID. As discussed below in greater detail, a MDU Manager 46 programmatically provisions the SSC 42 using restful API (Application Program Interface) that uses HTTP requests to get, put, post or delete data. The MDU Manager 46 is also be utilized to assign VLANs/Personal Networks to the tenants.

The WiFi controller 50 communicates with the access points 34 via Control and Provisioning of Wireless Access Points (CAPWAP), and Remote Authentication Dial-In User Service (RADIUS) may be utilized by the AAA unit 40. RADIUS is a networking protocol that provides centralized Authentication, Authorization, and Accounting management for users who connect and use a network service. A router 52 provides a connection from the MDU network to the Internet 24 or another network or source.

During individual tenant account creation according to an embodiment, a VLAN is assigned to a tenant's account via the MDU Manager 46. The tenant's account may be keyed to an email address, username, or the like. The tenant's devices are on-boarded to the tenant's account via a tenant portal for use by the tenant or the MDU Manager 46. Thus, when a client device has been added to an existing tenant's account, the WiFi infrastructure will automatically provide access to the tenant's Personal Network and other devices registered in the tenant's account.

In contrast, when an unknown client device attempts to connect to the MDU network via the infrastructure, the unknown device is assigned to a specific onboarding VLAN by the MDU Manager 46. On the onboarding VLAN, the unknown device will be redirected to an appropriate tenant portal for account creation and/or device onboarding. After onboarding, the registered device is moved to the VLAN assigned to the tenant.

According to an embodiment, dynamic VLAN assignment is accomplished via the MDU Manager 46 which provides the function of managing and reserving VLANs and assignments thereof on the MDU property. The AAA & PCRF unit 40 will request a VLAN for a tenant from the MDU Manager 46, and the MDU Manager 46 will mark the VLAN assigned as used and associated with the tenant master account. The MDU Manager 46 will also free VLANs when a tenant account is deleted.

Figure 4:
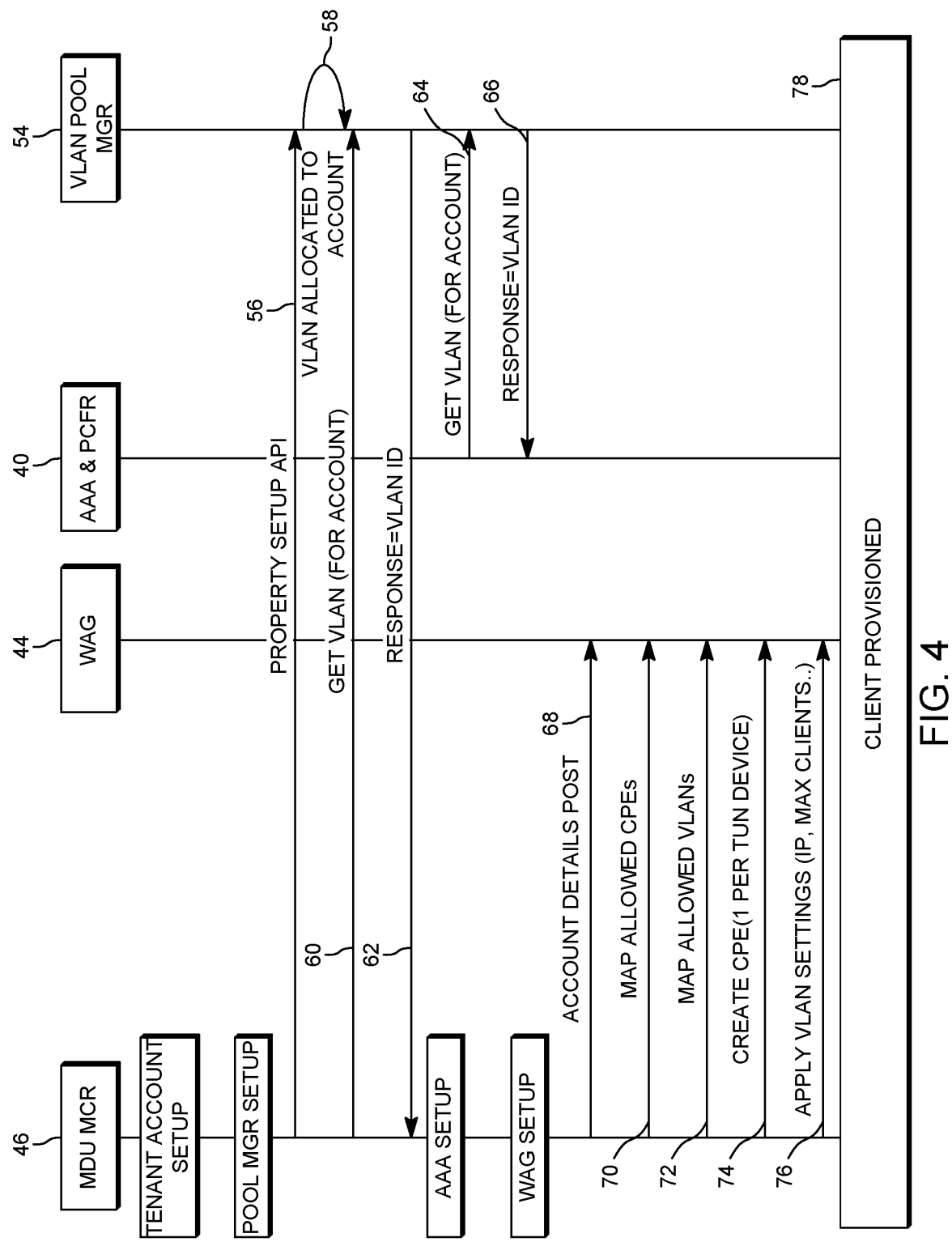
FIG. 4 is a provisioning and VLAN management call flow diagram in accordance to an embodiment.

By way of Example, a call flow diagram is shown in FIG. 4 relative to provisioning and VLAN management. The tenant account is set up in the MDU Manager 46. A VLAN Pool Manager 54 is notified of a potential new customer in step 56 via a property setup API from the MDU Manager 46, and the VLAN Pool Manager 54 allocates an available VLAN to the account (step 58). The MDU Manager 46 issues a get command for the allocated VLAN (step 60), and the VLAN Pool Manager 54 responds with the VLAN ID (step 62). The AAA unit 40 acquires the VLAN ID from the VLAN Pool Manager 54 upon first connection of the tenant (steps 64 and 66). Thereafter, the WAG 44 is provisioned. Account details, MAP allowed CPEs, MAP allowed VLANs, CPE creation (1 per Tunnel device) and VLAN settings application (IP, max clients, etc.) communications are sent (see steps 68, 70, 72, 74 and 76) from the MDU Manager 46 to the WAG 44. As a result, the client is provisioned on the network (step 78).

Figure 5:
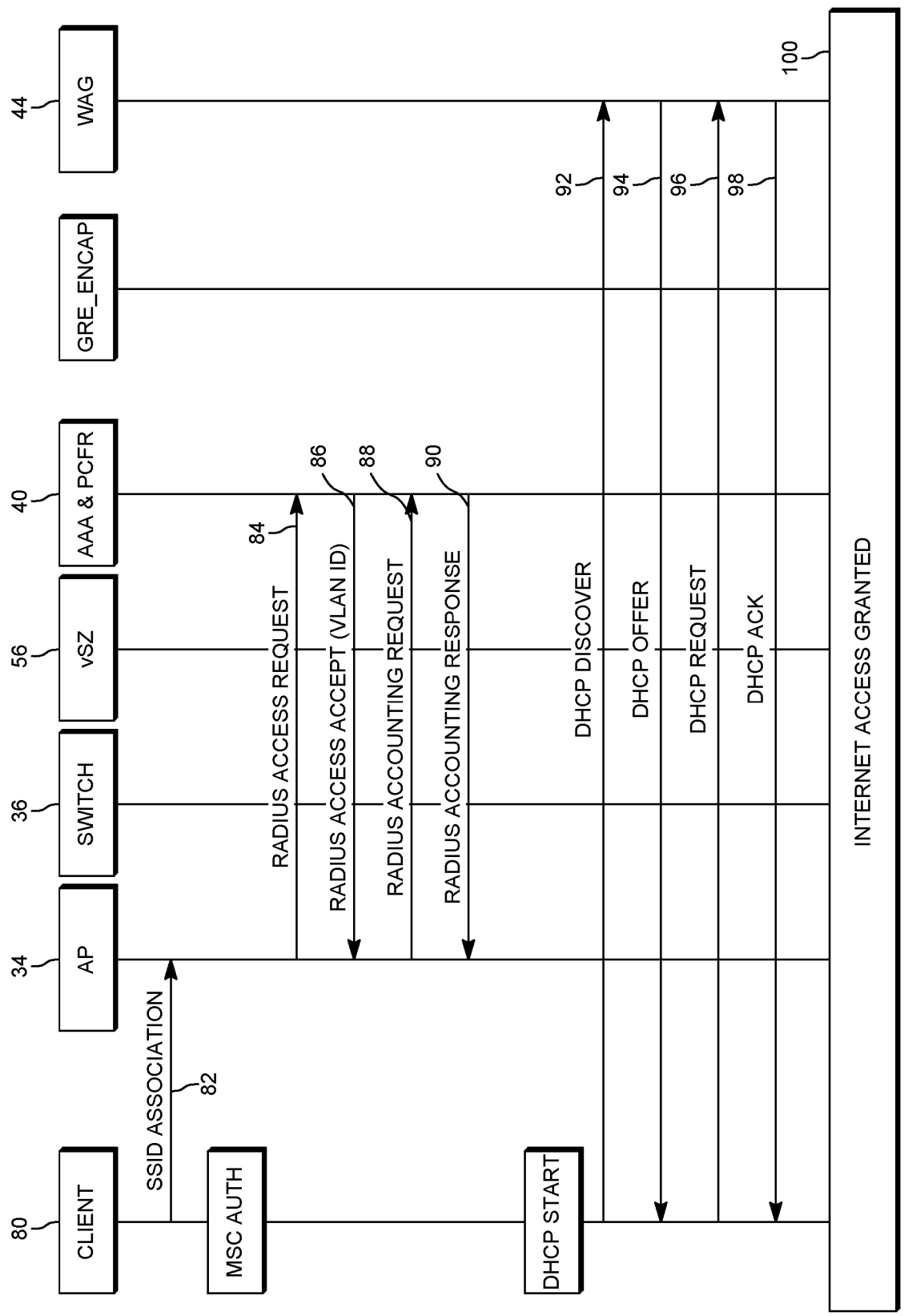
FIG. 5 is a call flow diagram for onboarding known user devices via an access point in accordance to an embodiment.

FIG. 5 shows an example of a call flow diagram relative to onboarding a known user via an access point 34. The user or tenant connects a device 80 to the access point (AP) 34 via SSID association (step 82). The AP 34 sends a MAB request to the AAA unit 40 (steps 84, 86, 88 and 90). The client device 80 gains Internet Access 100 over the MDU network by sending a Dynamic Host Configuration Protocol (DHCP) discover communication (step 92), receiving a DHCP offer (step 94) from WAG 44, requesting DHCP (step 96) from WAG 44, and receiving a DHCP acknowledgement (step 98) from the WAG 44.

Figure 6:
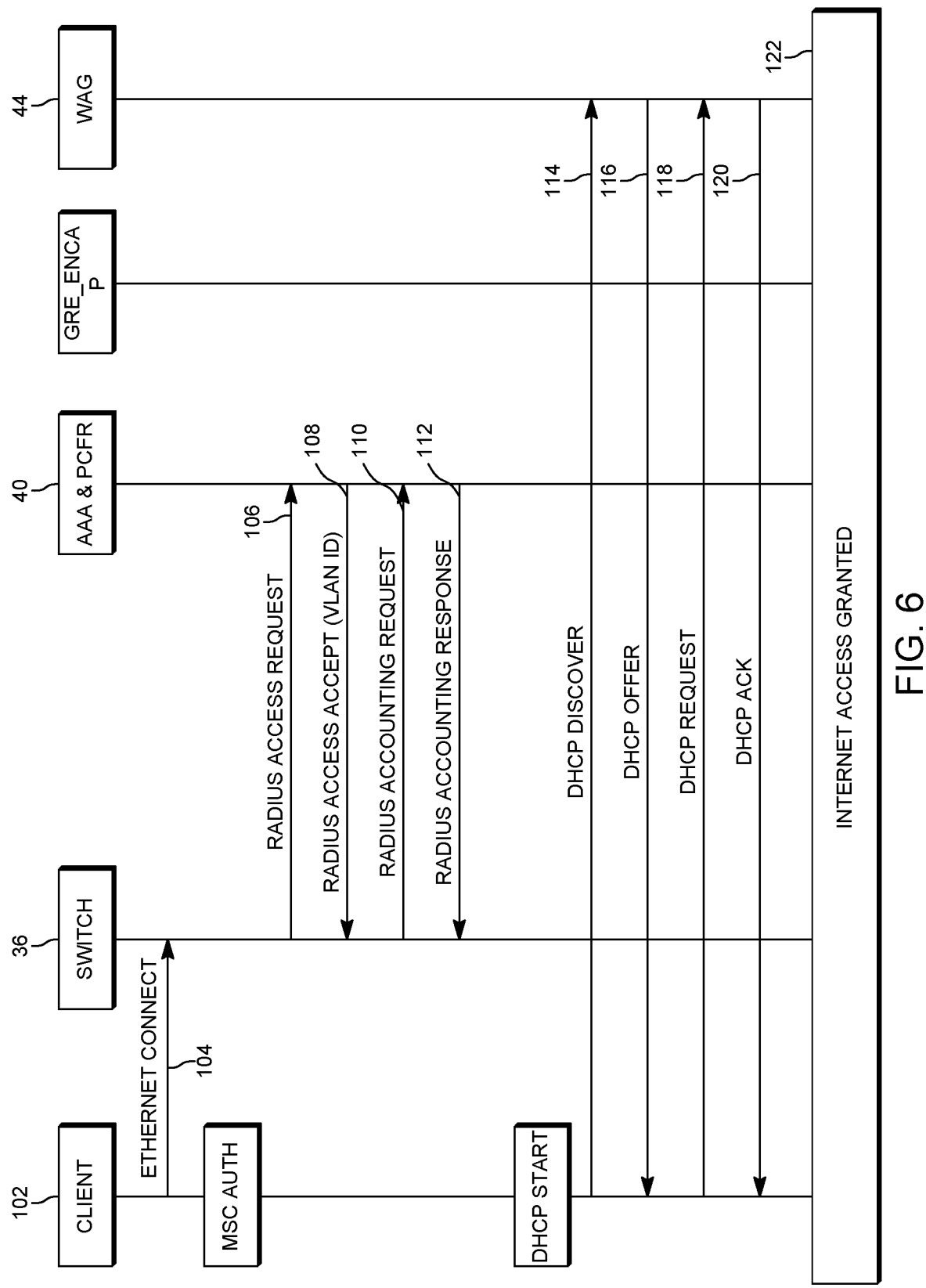
FIG. 6 is a call flow diagram for onboarding known user devices via a switch in accordance to an embodiment.

FIG. 6 shows an example of a call flow diagram relative to onboarding a known user (client device) wired to switch 36 via an ethernet connection. Here, the user connects a client device 102 to the switch 36 via an ethernet connection (step 104), and the switch 36 sends a MAB request to the AAA unit 40 (step 106). The AAA unit 40 returns an assigned tenant VLAN to the switch 36 (step 108). The switch 36 then communicates a master accounting request to the AAA unit 40 (step 110) which returns a master accounting response to the switch 36 (step 112). Thereafter, the client device 102 gains Internet Access 122 over the network by sending a Dynamic Host Configuration Protocol (DHCP) discover communication (step 114), receiving a DHCP offer (step 116) from WAG 44, requesting DHCP (step 118) from WAG 44, and receiving a DHCP acknowledgement (step 120) from the WAG 44.

A user or tenant may register or onboard a device to their account by accessing a portal webpage or the like that automatically appears on the screen of a device when an unauthenticated device attempts to connect to the MDU network. The user must already have an account or must create a new account to onboard a new device and therefore will be able to access the Internet or other devices connected to their Personal Network. The portal may request the users email address or other username in combination with an associated password or the like. The portal is configured to collect and verify new user information and may be configured to send a welcome email or other communication to the tenant. The user may use the portal to add and delete client devices, modify account information, change a password, or the like. When adding a new device, a description of the device and a MAC address of the device is required. This may be entered manually or may be detected automatically via DHCP or the like. The user may also use the portal to track client device usage statistics or the like.

A management portal may be provided to a property manager or owner. For instance, the management portal may be for use by an individual that is responsible for assisting tenants to access the MDU network (i.e., add users, delete users, reset user password, onboard or remove user devices). The management portal may also enable the manager to send email messages to one or all tenants. Session management may also be provided to enable a property manager to see all active and inactive sessions on the property and to remove any sessions. In addition, the management portal may be used to track, collect, and/or report network and/or infrastructure usage statistics.

The foregoing embodiments describe systems and methods that allow an individual who uses an account within an MDU to connect and use multiple devices associated with that account, while simultaneously preventing users of other accounts within the MDU from viewing, accessing, or using any of those devices. However, it may be desirable in some embodiments to allow an account user to make their devices available to chosen ones of other accounts in the MDU, without making those devices available to all accounts in the MDU.

Thus, in some embodiments it may be desirable for different account users in an MDU to share accounts. Such sharing may be accomplished in any of a variety of different ways. For example, some implementations may allow for preexisting MDU accounts of different persons to be merged into a single account. Alternatively, some implementations may allow for a creation of a separate joint account, in addition to separately-owned accounts, and by which selected devices may be individually registered. Still other implementations may allow account users to identify devices that may be shared with other accounts along with an identification of other accounts that share the device.

Figure 7:
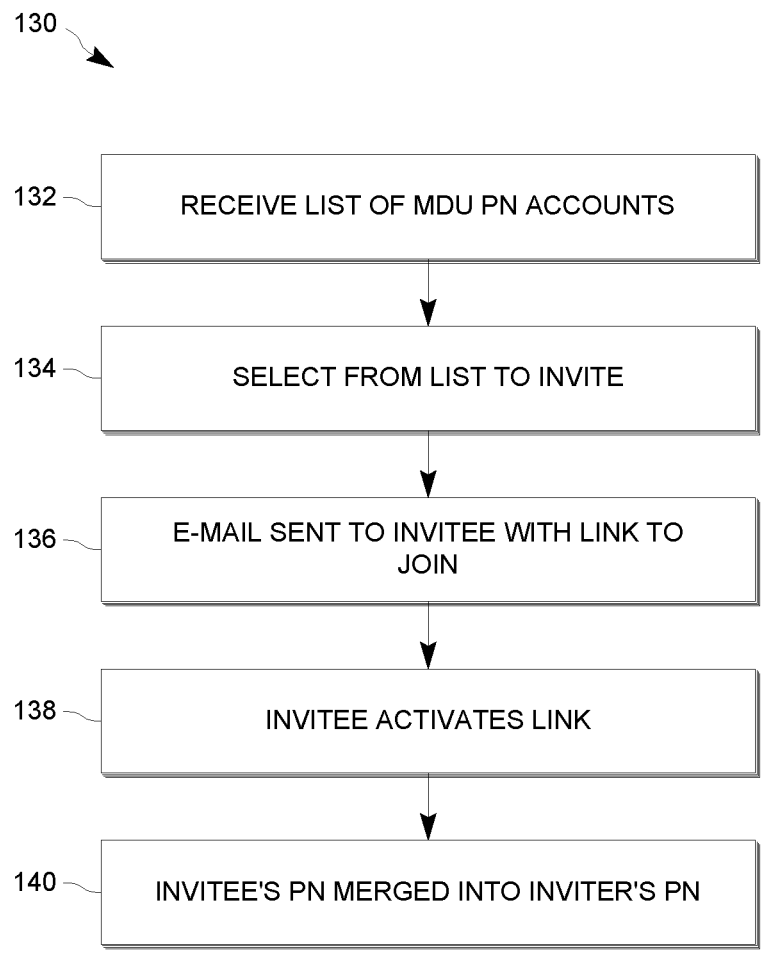
FIG. 7 shown an exemplary procedure for establishing merged Personal Networks.

FIG. 7, for example, shows an implementation 130 that allows users of preexisting accounts in an MDU to be merged into a single account via an invitation procedure effectuated by e-mail. At step 132 a user of a first account (user A) may receive a list of PN accounts in the MDU The list may be provided via a user interface accessed through the MDU manager 46 shown in FIG. 3, for example. At step 134 user A may select chosen other users from that list, at which point the MDU manager may at step 136 automatically send an invitation to the selected other users, each invitation including a link by which the invitation may be accepted. At step 138, the invitee (e.g. user B) may activate the link, after which at step 140 user B's PN is merged into that of user A's PN.

Figure 8A:
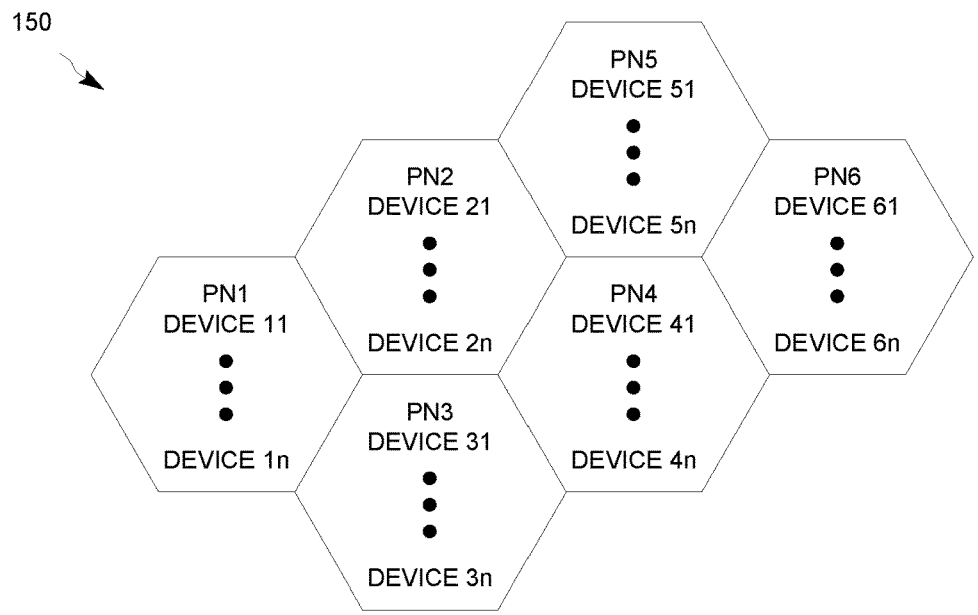
FIGS. 8A and 8B show an exemplary modification to the Personal Networks of an MDU produced by the procedure of FIG. 7.
Figure 8B:
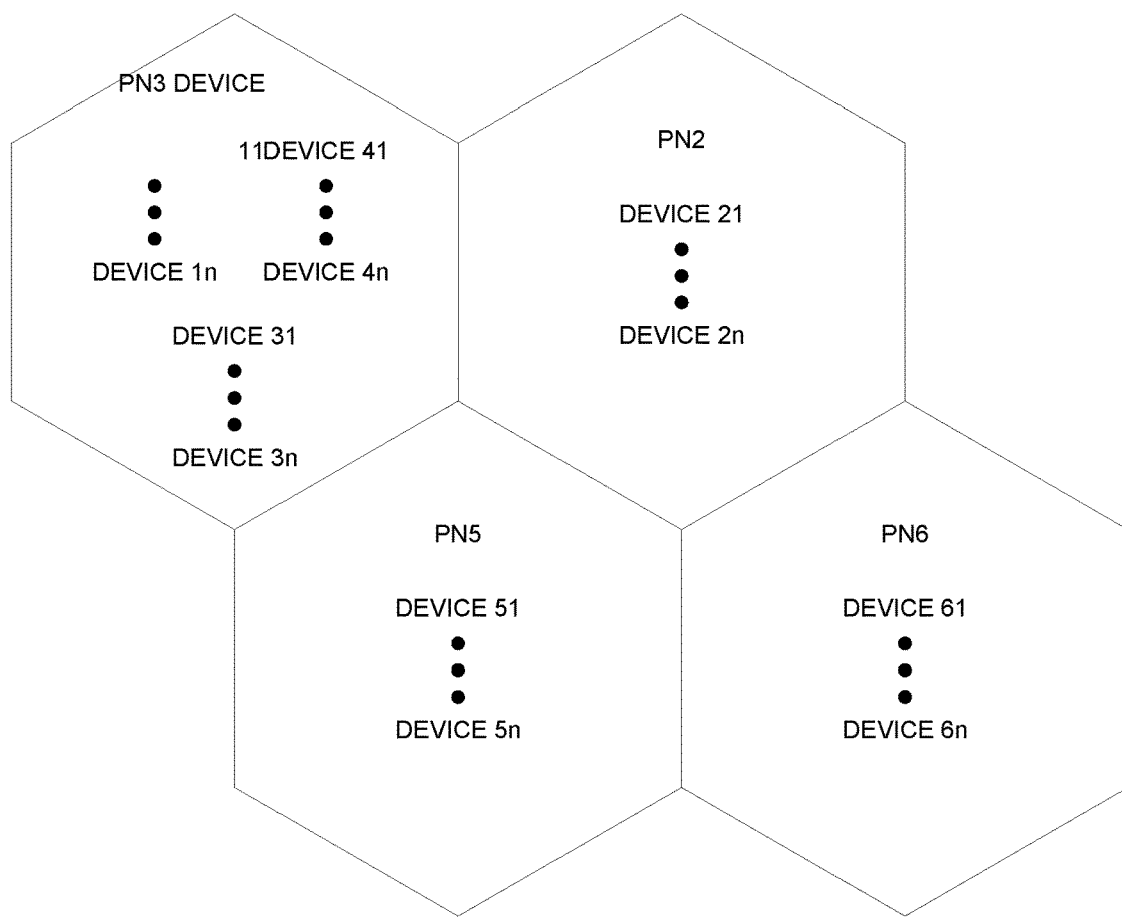

FIGS. 8A and 8B illustrate an exemplary implementation of the method of FIG. 7. Referring to FIG. 8A, an MDU 150 may include Personal Networks $PN_1$ to PN6, each having "n" number of associated devices, e.g. $PN_1$ includes devices 11 to 1n, PN2 includes devices 21 to 2n etc. In this example, the user of PN3 sends invitations to the users of $PN_1$, $PN_2$, and $PN_4$. Of those, users $PN_1$ and $PN_4$ accept. FIG. 8B shows the resulting configuration of PNs in the MDU where the devices of $PN_1$ and $PN_4$ are merged into that of $PN_3$. The remaining networks $PN_2$, $PN_5$, and $PN_6$ remain separate from each other and the merged $PN_3$.

In a preferred embodiment, when user PNs are merged, there will be an indication on the service portal of each user of accounts in the merged PN, and the accounts of each user remain active and linked to the merged PN. In this manner, each user may manage their own devices, add and/or remove devices from the shared PN, etc.

Other embodiments, instead of merging the PNs of one or more users into that of another user, may instead create a new joint PN, in addition to those held separately by individuals. Thus, when a user sends an e-mail invitation, for example, and one or more responses is received, this embodiment may instead set up a new joint PN, after which each user may register devices to the new joint PN.

A system for carrying out any of the above disclosed methods or arrangements may include software or the like provided on a circuit board or within another electronic device and can include various processors, microprocessors, modules, units, components, controllers, managers, chips, storage drives, and the like. It will be apparent to one of ordinary skill in the art that systems, modules, components, units, managers, processors, servers, and the like may be implemented as electronic components, software, hardware or a combination of hardware and software for purposes of providing a system and may be provided by a cloud-based system.

Embodiments may also include at least one non-transitory computer readable storage medium having computer program instructions stored thereon that, when executed by at least one processor, can cause the at least one processor to perform any of the steps described above.

While the principles of the invention have been described above in connection with specific devices, apparatus, systems, algorithms, and/or methods, it is to be clearly understood that this description is made only by way of example and not as limitation. One of ordinary skill in the art will appreciate that various modifications and changes can be made without departing from the scope of the claims below.

The above description illustrates various embodiments along with examples of how aspects of particular embodiments may be implemented and are presented to illustrate the flexibility and advantages of particular embodiments as defined by the following claims and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims.

The invention claimed is:

1. A communications network comprising:

a plurality of personal networks, each associated with a respective user account, and each personal network having respectively associated network devices not accessible outside their associated personal network; and a network manager capable of using information from at least two networks, from the plurality of personal networks, to create a combined personal network associated with the user accounts of the at least two networks, wherein creating the combined personal network comprises:

receiving information specifying the at least two networks;

in response to the information, providing invitations to users associated with the user accounts of the at least two networks to join the combined personal network; and in response to receiving acceptances of the invitations, merging the network devices associated with the user accounts into the combined personal network.

2. The communications network of claim 1, wherein the network manager merges at least one of the at least two networks into another of the at least two networks.

3. The communication network of claim 2, wherein the network manager populates the combined personal network with the devices respectively associated with each of the at least two networks.

4. The communications network of claim 3, wherein the devices populated in the combined network are not accessible to users not associated with the combined network.

5. The communications network of claim 3, wherein each user associated with the combined network is capable of managing the devices originally associated with their personal network.

6. The communications network of claim 1, wherein the network manager creates a combined personal account without merging the at least two networks.

7. The communications network of claim 6, wherein devices may be associated with the combined personal network after the combined personal network is created.

8. The communications network of claim 1, wherein the network manager includes an interface by which personal networks may be selectively combined by users.

9. The communications network of claim 8, wherein the user interface presents a list of available personal networks for selection by a first user, and sends an invitation to users of selected personal networks.

10. The communications network of claim 9, wherein the network manager creates the combined network by merging personal networks into that of the first user.

* * * * *